No. 621,658. Patented Mar. 21, 1899.
O. L. GRIMSRUD.
VEHICLE WHEEL.
(Application filed Oct. 25, 1898.)
(No Model.)
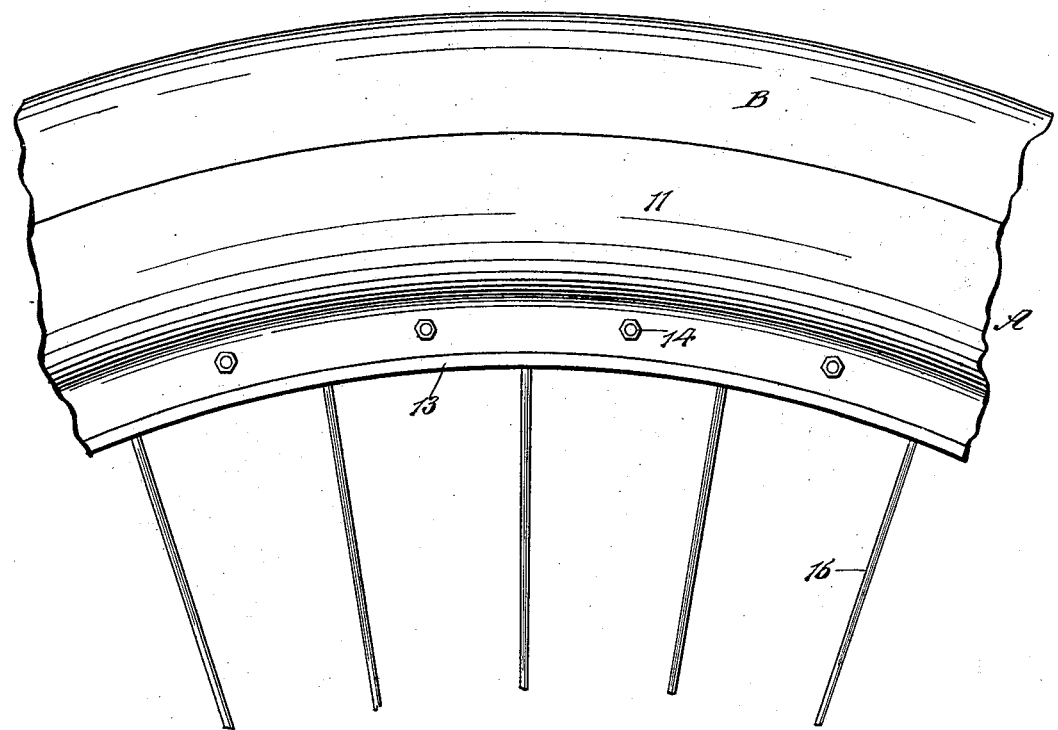
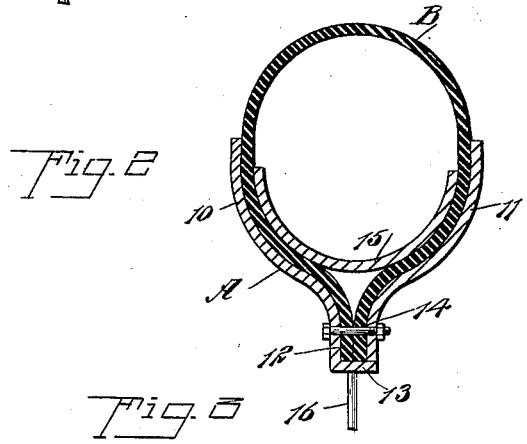
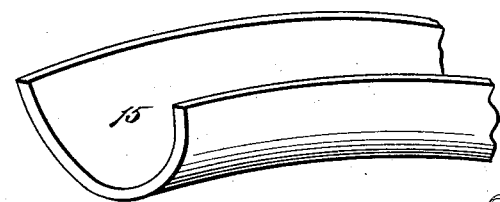
WITNESSES:
INVENTOR
BY
ATTORNEYS.

UNITED STATES PATENT OFFICE.

OLAUS L. GRIMSRUD, OF LEAD, SOUTH DAKOTA.

VEHICLE-WHEEL.

SPECIFICATION forming part of Letters Patent No. 621,658, dated March 21, 1899.

Application filed October 25, 1898. Serial No. 694,537. (No model.)

*To all whom it may concern:*

Be it known that I, OLAUS L. GRIMSRUD, of Lead, in the county of Lawrence and State of South Dakota, have invented a new and useful Improvement in Vehicle-Wheels, of which the following is a full, clear, and exact description.

My invention relates to the construction of vehicle-wheels, and especially to the construction of elastic tubular tires and rims for the same.

The object of the invention is to provide a tubular elastic tire that need not be inflated, and to construct such a tire and a rim therefor in a simple, durable, and economic manner and so that the parts may be quickly and conveniently assembled and secured.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a side elevation of a portion of a wheel rim and tire constructed in accordance with my invention. Fig. 2 is a transverse section through the improved rim and tire, the view being on a larger scale than that shown in Fig. 1; and Fig. 3 is a detail perspective view of a portion of an expanding or shaping section used in the construction of the device.

The rim consists of two sections 10 and 11, made of wood, metal, or other suitable material, having their opposing faces concaved from their outer longitudinal edges to a point near their inner longitudinal edges. The space between the outer longitudinal edges of the sections of the rim substantially corresponds to the outer diameter of the tire B to be employed, while the two sections at their inner edges are brought quite close together to form a trough 12, which trough in cross-section is practically rectangular, as shown in Fig. 2, although said trough may be of any other cross-sectional shape.

The rim-section 10 is provided with a flange 13 at its inner longitudinal edge, the flange being at a right angle to the body of the section, and this flange forms what may be termed the "bottom" of the trough 12, as the inner longitudinal edge of the opposing rim-section 11 bears against the said flange, as shown in Fig. 2. In the construction of the tire an endless strip or belt of rubber or other elastic material is employed. When constructing the rim and tire, one longitudinal edge of the belt is made to rest upon the flange 13 of the section 10 and an expanding or shaping section 15 is made to engage with the inner face of the belt, the said expanding or shaping section being segmental or semicircular in cross-section, as shown in Figs. 2 and 3. The belt is then carried around the shaping or expanding section until the two longitudinal edges of the belt have been brought together, both resting upon the flange 13. The section 11 is then placed in position, and the sections 10 and 11 are secured together by bolts 14 or their equivalents, the bolts passing through the contacting portions of the tire-belt B, which will have assumed a tubular shape, as disclosed in Fig. 2, and a part of the sides of the tire thus constructed will be securely held between the expanding or shaping section and the sections 10 and 11 of the rim.

It is evident that the tire need not be inflated, since the elasticity of the material employed and the manner in which the tire is fitted in the rim and the rim is constructed will cause said tire to remain expanded. The spokes 16 of the wheel are secured to the rim by entering them in a suitable manner into the flange 13 of the rim-section 10.

The expanding or shaping section 15 may be constructed of any desired material; but a spring material—such as brass, steel, or other metal—is preferably employed, and the same material may be utilized in the construction of the rim.

Having thus described my invention, I claim as new and desire to secure by Letters Patent—

A wheel, having a rim and a tire, the rim being formed of two rigid sections, the outer portions of which are flared outwardly to receive the tire, and the inner portions of which are converged toward each other to form a trough, the inner edge of one of the sections having a flange thereon and the flange meeting the inner edge of the other section, and the tire being formed of a section of flexible material the edges of which are introduced between the inner portions of the sections of the rim, fastening devices passing through the inner portions of the sections of the rim and the adjacent portions of the tire, and an expanding section located in the tire and compressing the same against the outer portions of the sections of the rim.

OLAUS L. GRIMSRUD.

Witnesses:
 MORRIS BRODY,
 M. C. HILLOCK.